March 8, 1938. D. L. WINTERS 2,110,350
SPEED CONTROL SYSTEM FOR VEHICLES
Filed Sept. 29, 1937 2 Sheets-Sheet 1

Inventor
David L. Winters
By
Attorneys

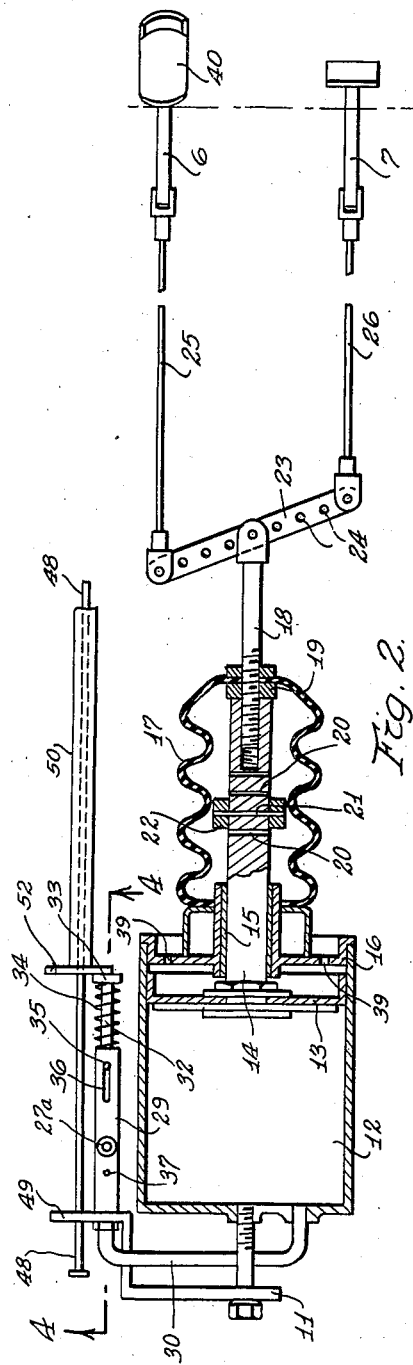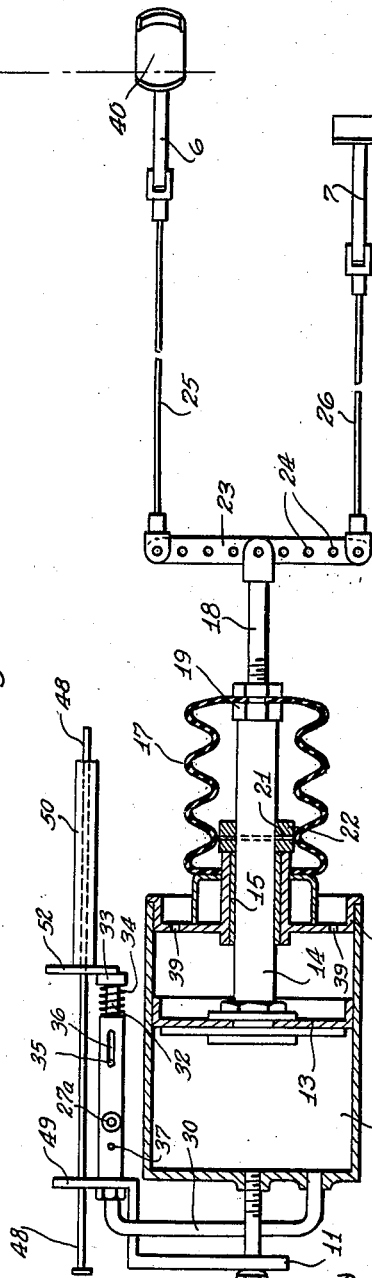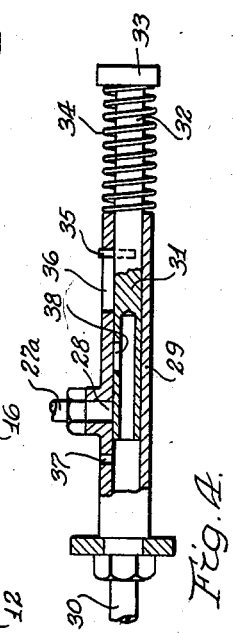

Patented Mar. 8, 1938

2,110,350

UNITED STATES PATENT OFFICE 2,110,350

SPEED CONTROL SYSTEM FOR VEHICLES

David L. Winters, Detroit, Mich.

Application September 29, 1937, Serial No. 166,383

3 Claims. (Cl. 192—13)

This invention relates to speed control apparatus for automotive vehicles and has for its primary object to provide for application of the brake and release of the clutch by a single power actuator which is subject to control by the vehicle operator and which requires a minimum amount of thought, movement and effort on the part of the operator in the control thereof.

Another object of the invention is to provide apparatus of the type above mentioned which provides means operable to cause release of the brake, engagement of the clutch and controls for opening of the vehicle throttle in conjunction therewith.

Another object of the invention is to provide apparatus of the above mentioned character which is operable to permit the use of manual pressure in addition to that of the power actuator to effect quicker stops than is provided for by the power actuator alone.

Another object of the invention is to provide means for actuating both the brake and the clutch by a single power actuator, said means being constructed to compensate for the difference in travel between the brake and clutch mechanisms, to compensate for the difference in power necessary for actuation of the brake and clutch and to compensate for actuators capable of developing varying power.

Another object of the invention is to provide apparatus for actuating both the brake and the clutch by a single power actuator including means for preventing excessive application of the brake by power. To this end, upon actuation of the actuator, the resistance to the release of the clutch effects, through an equalizing means, initial or light engagement of the brakes, and determines the extent of such initial application in so far as their application by power is concerned. In order to increase the braking pressure to a point in excess of that determined by the resistance to release of the clutch it is necessary to do so manually.

Another object of the invention is to provide apparatus of the character above mentioned embodying controls disposed upon the brake pedal of the vehicle in order that the vehicle operator may retain his foot upon the brake pedal at all times during operation of the vehicle. In this respect the invention eliminates the time interval necessary for the operator of a conventional vehicle to remove his foot from the accelerator and apply it to the brake pedal. The brake pedal, in this case, is equipped with additional return springs in order that it may support the weight of the operator's foot and leg.

With the above and other ends in view the invention consists in matters hereinafter more particularly described with reference to the accompanying drawings, in which Figure 1 is a fragmental side view of an automobile with the present apparatus thereon;

Figs. 2 and 3 are sections of the power actuator, and

Fig. 4 is a section of the valve.

Like characters of reference are employed throughout to designate corresponding parts.

Figure 1:
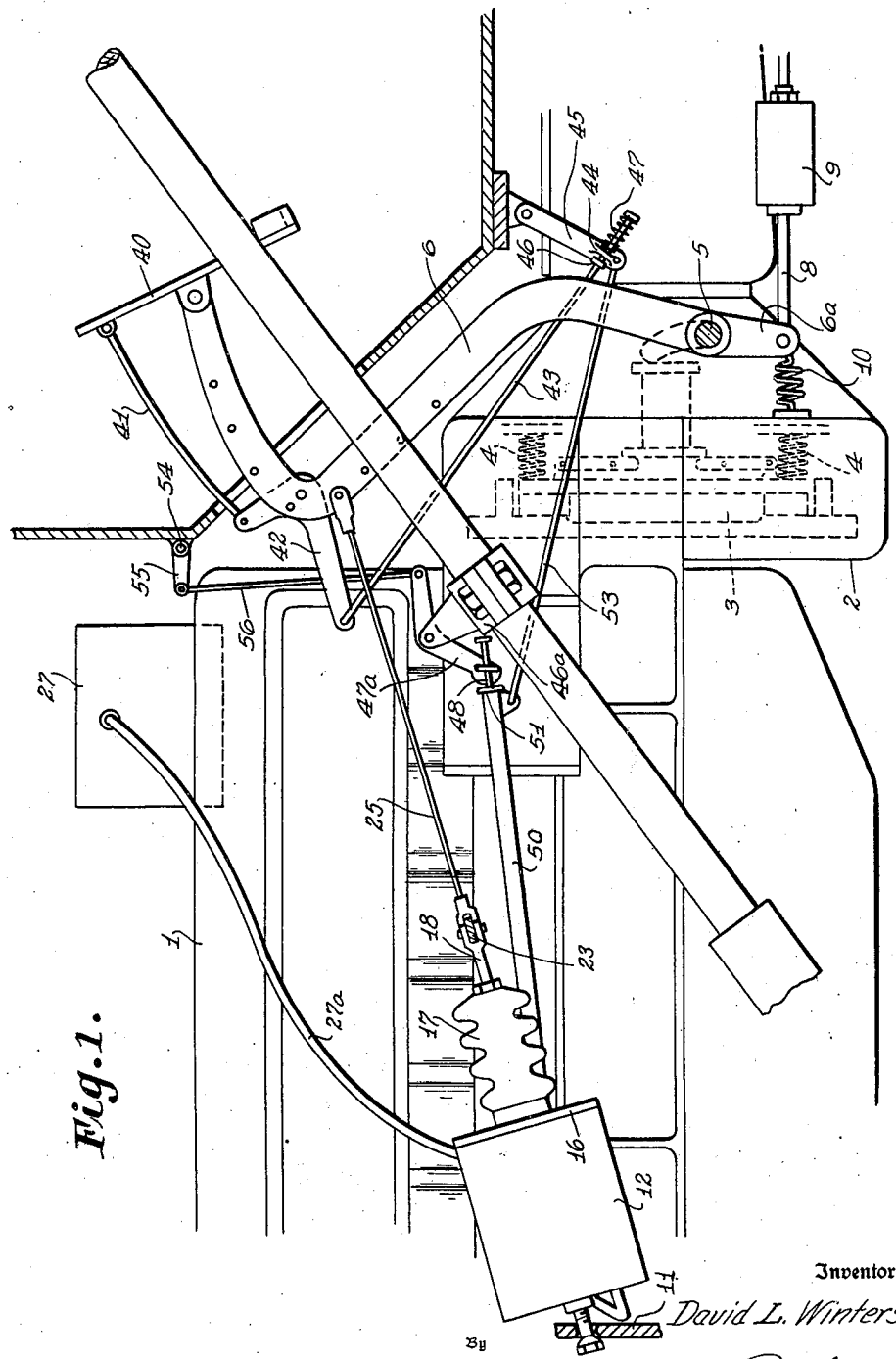

The present invention is applicable to any conventional automotive vehicle. Such vehicles, as is so well known that it is not illustrated here, employ an internal combustion engine with a throttle valve and an intake manifold. They have brakes adapted to be applied by depressing a foot pedal and a clutch adapted to be released by depressing a foot pedal. This invention relates to means operable by suction from the intake manifold for operating the brake and clutch pedals and in conjunction therewith, means for operating the throttle control linkage.

Referring to Fig. 1, the numeral 1 designates a fragment of an automotive vehicle engine and 2 the clutch housing in which is housed a clutch. The clutch is more or less diagrammatically shown at 3 and is normally held engaged by springs 4. The clutch is adapted to be released by rotating the shaft 5, upon which the brake pedal 6 is pivoted. The clutch pedal 7, shown in Figs. 2 and 3, has been removed from Fig. 1 in order to illustrate the brake pedal. The brake pedal has an extension 6a with a rod 8 connected thereto for operating a hydraulic brake actuator 9, and has a return spring 10.

Pivotally secured by a bracket 11, adapted to be attached to a stationary part of the engine bed or vehicle frame, is a cylinder 12 having a piston 13 slidable therein. Attached to the piston is a rod 14 which is slidable in a bearing 15 in a removable end wall 16. The outer projecting end of the rod 14 is protected from dirt etc. by a flexible skirt 17 and has a connecting rod 18 screwthreadedly received in the end thereof and adapted to be locked in various positions of adjustment by a jamb nut 19. The rod 14 also has a series of spaced apart diametric holes 20 adapted to receive a pin or like securing element 21 for holding a collar 22 stationary thereon.

Pivotally connected to the outer end of the connecting rod 18 is an equalizer bar 23 having a series of apertures 24 therein. Connected to the equalizer bar on one side of its pivot is a cable 25, the cable being connected also to the brake pedal, and the equalizer bar is connected on the other side of its pivot to the clutch pedal 7 by a cable 26.

Suitably supported adjacent the engine 1 is a tank 27, adapted to be connected to the intake manifold (not shown) of the engine. It will be readily understood by those skilled in the art to which this invention pertains that connection of the tank 27 with the intake manifold will maintain a partial vacuum in the tank. This partial vacuum is utilized to actuate the piston in the cylinder 12.

Connected to the tank 27 is a conduit 27a which extends to the port 28 in a valve body 29, supported adjacent the cylinder 12. The interior of the valve body 29 is connected to the interior of the cylinder 12 by a conduit 30. Mounted in the valve body 29 is a slidable valve plug 31 having a stem 32 with a head 33 thereon, a coiled spring 34 being mounted between the head 33 and the valve body. Movement of the valve plug is restricted by a pin 35 which operates in the slot 36, and the spring functions to move the plug to one extreme position as defined by the pin and slot. With the valve plug 31 positioned as shown in Fig. 4, it covers the port 28 and thereby prevents communication between the source of vacuum and the cylinder 12. At this time, however, an atmospheric air port 37 is uncovered whereby atmospheric air may enter the cylinder 12. Upon movement of the valve plug toward the left hand side of Fig. 4, by means which will hereinafter be described, the air port 37 is covered and a plug port 38 communicates with the vacuum port 28 to place the cylinder 12 in communication with the source of vacuum. The end wall 16 of the cylinder 12 has ports 39 for admitting atmospheric air to the cylinder on the opposite side of the piston to which the vacuum source is thus connected.

Mounted upon the foot pedal 6 is a pivoted treadle 40 having a link 41 connected thereto at a point spaced from its pivot. The other end of the link 41 is connected to one end of a bell crank lever 42, also pivoted on the pedal 6, and the remaining end of the bell crank lever 42 has a link 43 connected thereto. The free end of the link 43 is slidably received in a bearing 44 on a swinging arm 45, the link 43 having a collar 46 adapted upon movement in one direction to engage the bearing 44, and a spring 47 mounted thereon for engagement with the other side of the bearing 44 upon movement in the other direction. Thus movement of the link 43 in one direction positively swings the arm 45 in one direction, while movement of the link 43 in the other direction yieldingly swings the arm 45 in the other direction.

Pivotally mounted upon a bracket 46a is a bell crank lever 47a, a convenient means of support for the bracket 46 being the steering column of the vehicle, as shown. Connected to one end of the bell crank lever 47 is a rod 48 whose other end is free to slide in a bracket 49 attached to the cylinder 12. Slidably mounted upon the rod 48 is a sleeve 50, having flanged ends 51 and 52, and connected to the swinging arm 45 by a link 53. It becomes apparent, therefore, that swinging movement of the arm 45 in one direction pulls the flanged end 51 into engagement with the bell crank 47a and rocks the same. Swinging movement of the arm 45 in the other direction causes the sleeve 50 to slide upon the rod 48, and during such sliding movement the flanged end 52 engages the head 33 and moves the valve plug 31 from the position shown in Fig. 2 to that shown in Fig. 3.

As is usual with vehicles employing internal combustion engines, a transverse shaft 54 is provided and is connected to the engine throttle (not shown). It will be readily understood, although it is not illustrated, that the shaft 54 is so connected to the throttle valve that rotative movement in one direction causes opening of the throttle while rotative movement in the other direction causes the throttle to close. The shaft 54 has a lever 55 thereon which is connected to the accelerator pedal in a conventional vehicle, but in the present case this lever is connected to the bell crank lever 47a by a link 56 whereby it is swung by rocking movement of the bell crank lever 47a.

The main purpose of the structure above described is to make possible the stopping of automotive vehicles in a shorter space than is possible with conventional vehicles. To do this, the structure is designed to eliminate the time interval required by conventional controls to remove the operator's foot from the accelerator pedal to begin the application of pressure on the brake pedal. The manner in which this is accomplished will now be described.

Assuming that the engine is operating, the clutch engaged, and the transmission in gear, the vehicle speed may be controlled by placing pressure upon the upper part of the treadle, as by pressing with the ball of the foot. This causes the treadle to pivot and rock the bell crank lever 42 to swing the arm 45 in a direction causing the end 51 of the sleeve 50 to engage the bell crank lever 47a. Rocking of the bell crank lever 47 moves the link 56 and oscillates the shaft 54 to regulate the throttle. The vehicle speed may thus be regulated.

When it is desired to stop the vehicle, slowly for example, the operator depresses the heel portion of the treadle 40, thus causing the reverse action of the throttle connections and closing of the throttle. The swinging arm 45 is swung in a direction to slide the sleeve 50 whereby its end 52 engages the head 33 and moves the valve plug 31 from the position shown in Fig. 2 to that shown in Fig. 3. The cylinder 12 is thus placed in communication with the source of vacuum and air under atmospheric pressure acts upon the other side of the piston 13, through ports 39, to move the piston, as shown. Movement of the piston 13 is limited by engagement of the collar 22 with the end of the bearing 15, and the collar is so positioned that movement of the piston is only sufficient to completely actuate the clutch pedal and partially actuate the brake pedal.

As shown in Fig. 3, the piston is at its extreme point of movement. The clutch pedal is pulled down to its extreme point of movement, and the clutch springs 4, in urging the clutch toward its engaged position, transmit a force upon the equalizing bar 23 which tends to actuate the brakes. It is apparent that the pressure upon the brakes cannot exceed the pressure of the clutch springs due to the function of positively limiting the stroke of the piston 13. This pressure is sufficient to overcome the back pressure exerted by brake shoe retracting springs, the brake pedal retracting spring 10, and friction whereby all brake shoe clearances are taken up and the shoes caused to lightly engage their drums. The vehicle, with such operation of the controls, gradually stops and is held stationary with the clutch disengaged.

When it is desired to stop the vehicle more rapidly than is provided for by the power means controlled as above described the operator places pressure upon the treadle tending to force the pedal downwardly. Inasmuch as the power means has taken up all clearances and initially applied the brakes, the entire pressure applied by the operator is effective in stopping the vehicle. That is, none of the pressure exerted by the operator is required to overcome back pressure of the shoe retracting springs or friction. Inasmuch as the brake shoes will be in light engagement with the device positioned as shown in Fig. 3, manual pressure on the brake pedal does not result in appreciable movement thereof, and this movement is not sufficient to permit engagement of the clutch pedal by loosening the cables 25 and 26.

In the event of an emergency stop, the pedal may be quickly pushed downwardly, due to the fact that the operator's foot remains on the pedal at all times. By merely pushing the treadle downwardly, without pivoting the same from a natural position, such as shown in Fig. 1, the arc of movement of the bell crank 42 around the axis of the shaft 5 causes the link 43 to be moved in a direction causing swinging movement of the arm 45 and movement of the sleeve 50 in a direction causing actuation of the power actuator. By tipping the treadle forwardly as the pedal is manually depressed, the operator may cause the valve plug 31 to remain stationary. In other words, the brakes may be applied without causing actuation of the power actuator.

With the vehicle stationary, the brake engaged and the clutch disengaged, the throttle will be at its idling position. By tipping the treadle forwardly, the valve plug 31 is retracted and places the cylinder 12 on both sides of the piston 13, in communication with the atmosphere, thus permitting the piston to resume its normal position. The brake is released, the clutch is engaged, and continued movement of the treadle results in acceleration of the vehicle engine.

It is apparent from the foregoing that the apparatus described functions, subject to control by the operator, to cause engagement of the brake and disengagement of the clutch by a single power actuator, and that the extent to which the brakes are applied is controlled by the springs which cause clutch engagement. This function results through connection of the brake and clutch pedals to the power actuator by the equalizer bar 23, and by restricting the piston movement. To suit different operating conditions, the piston movement may be stopped at different points by varying the position of the collar 22. However, the pressures required to operate the brakes and clutch may vary, as between the brakes and clutch, in which case the different pressures must be compensated for. Such varying pressures may be compensated for by attaching the cables 25 and 26 to the equalizer bar at different distances from its pivot. For this purpose the equalizer bar is provided with a plurality of holes 24 arranged at different distances from its center.

The pressure required to operate the brakes and clutch varies with different types of vehicles, as also does the distance which the pedals must travel. This condition is compensated for by providing for the attachment of the cables 25 and 26 at different distances from the pivots of their respective pedals, and also by providing for adjustment movement of the collar 22. For this purpose, the pedal 6 is shown as having a series of apertures spaced at different distances from the pivot of the pedal. When the leverage is varied, by attaching the cables at differently spaced points from the axis of the pedal, the collar 22 may be adjusted to provide for the proper amount of movement.

From the foregoing, it will be clear that when driving with the throttle open, with the upper part of the treadle advanced, a slight pressure with the heel is all that is required to close the throttle, disengage the clutch, and set the brake with both power and foot pressure, with the minimum of time, motion and effort required to effect an emergency stop.

Although a specific embodiment of the invention has been illustrated and described it will be understood that various changes may be made within the scope of the appended claims without departing from the spirit of the invention and such changes are contemplated.

What I claim is:

1. In combination with an automotive vehicle having a brake operating member, a power actuator, a personal control for said actuator, said personal control being mounted on said brake operating member, an equalizer connected between its ends to said actuator for movement thereby, means connecting said equalizer at a point on one side of its pivot to said brake operating member, said vehicle also having a clutch with yieldable means for causing engagement thereof, and means connecting said clutch to said equalizer bar on the other side of its pivot whereby the clutch springs determine the extent of operation of the brake.

2. In combination with an automotive vehicle having a brake operating member, a power actuator, a personal control for said actuator, an equalizer connected between its ends to said actuator for movement thereby, means connecting said equalizer at a point on one side of its pivot to said brake operating member, means for positively limiting the extent of travel of said equalizer, said vehicle also having a clutch with yieldable means for causing engagement thereof, and means connecting said clutch to said equalizer bar on the other side of its pivot whereby the clutch springs determine the extent of operation of the brake.

3. In combination with an automotive vehicle having a brake and a clutch with spring means urging engagement movement thereof, a power actuator, means connecting said actuator with said brake and clutch and means restricting movement of said actuator whereby the clutch springs determine the extent of operation of the brake by power.

DAVID L. WINTERS.